United States Patent [19]

Chappell et al.

[11] Patent Number: 5,547,208
[45] Date of Patent: Aug. 20, 1996

[54] VEHICLE SAFETY EXIT APPARATUS

[75] Inventors: John W. Chappell; Anthony Shangler, both of Pleasant Hill, Mo.; Dennis L. Chappell, 501 Santa Ana, Rancho Viejo, Tex. 78575, executor of said John W. Chappell, deceased

[73] Assignee: Dennis L. Chappell, Rancho Viejo, Tex.

[21] Appl. No.: 403,643

[22] Filed: Mar. 14, 1995

[51] Int. Cl.$^6$ .......................... B60K 28/12; B60K 28/14
[52] U.S. Cl. .......................... 180/281; 307/66; 307/10.1; 307/23; 320/15
[58] Field of Search ...................... 180/281, 282, 180/271; 307/10.1, 9.1, 23, 34, 38, 66; 320/15

[56] References Cited

U.S. PATENT DOCUMENTS

| | | | |
|---|---|---|---|
| 2,714,521 | 8/1955 | Graham | 180/281 |
| 2,716,706 | 8/1955 | Palmer | 307/66 |
| 2,729,750 | 1/1956 | Draper et al. | |
| 2,843,758 | 7/1958 | Bement. | |
| 2,866,907 | 12/1958 | Gebhard. | |
| 3,105,909 | 10/1963 | Jones. | |
| 3,108,190 | 10/1963 | Gebhard. | |
| 3,151,698 | 10/1964 | Pollock | 180/281 |
| 3,340,402 | 9/1967 | Curtis. | |
| 3,356,857 | 12/1967 | Strasen et al. | 307/66 |
| 3,479,767 | 11/1969 | Gardner et al. | |
| 3,835,333 | 9/1974 | Balan | 307/23 |
| 4,127,782 | 11/1978 | Omura et al. | |
| 4,258,945 | 3/1981 | Pouget. | |
| 4,307,789 | 12/1981 | Bertot. | |
| 4,321,522 | 3/1982 | Matsunaga. | |
| 4,385,240 | 5/1983 | Sato. | |
| 4,450,390 | 5/1984 | Adnrei-Alexandru et al. | |
| 4,785,907 | 11/1988 | Aoki et al. | |
| 4,896,050 | 1/1990 | Shin-Chung. | |
| 5,138,182 | 8/1992 | Kokubu. | |
| 5,187,381 | 2/1993 | Iwasa. | |
| 5,192,873 | 3/1993 | Wrenbeck et al. | |
| 5,194,756 | 3/1993 | Darbesio. | |
| 5,327,990 | 7/1994 | Busquets. | |
| 5,369,306 | 11/1994 | Dib. | |

FOREIGN PATENT DOCUMENTS 5457720   5/1976   Japan ................................ 180/281

Primary Examiner—Karin L. Tyson
Attorney, Agent, or Firm—Hovey, Williams, Timmons & Collins

[57] ABSTRACT

A vehicle safety exit apparatus for use in a vehicle having a main battery, an ignition switch and a plurality of electric window and door lock operators is provided. The vehicle safety exit apparatus includes an auxiliary battery operable for delivering power to the vehicle's electrically operated window and door lock operators in emergency situations. The apparatus also includes a control assembly coupled between the auxiliary battery and the window and door lock operators for controlling the delivery of power therebetween. The control assembly automatically opens the vehicle's windows and door locks when the vehicle's main battery is destroyed or disconnected from the vehicle's electrical system during a collision.

22 Claims, 1 Drawing Sheet

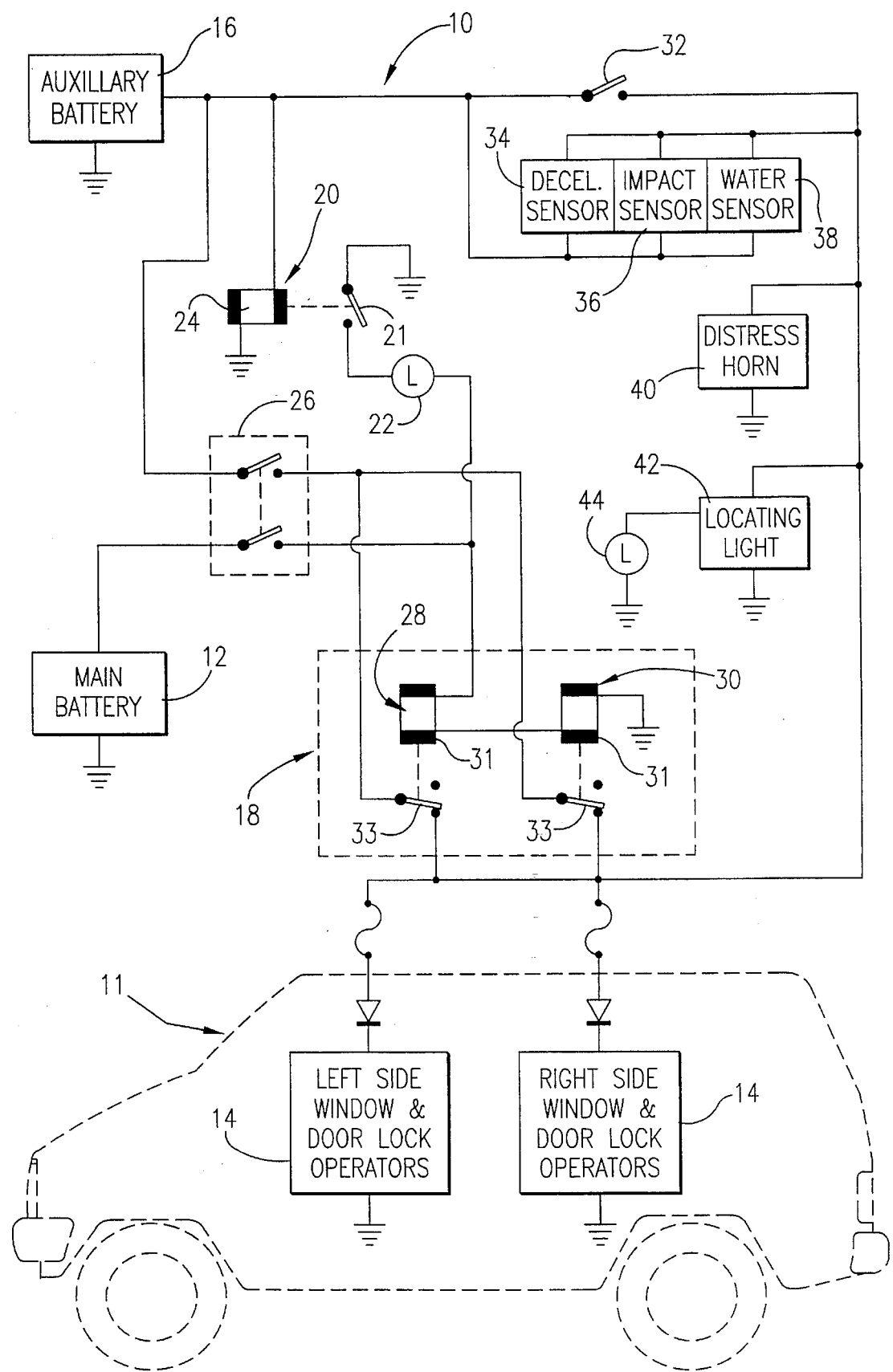

VEHICLE SAFETY EXIT APPARATUS

BACKGROUND OF THE INVENTION

1. Field of the Invention

The present invention relates to vehicle safety devices, and more particularly to a vehicle safety exit apparatus including an auxiliary battery and a control assembly for controlling the delivery of power from the auxiliary battery to the vehicle's electric window and door lock operators during emergency situations.

2. Description of the Prior Art

Vehicles having electrically operated windows and door locks have become more prevalent due to consumers' demands for convenient vehicle options. Electrically operated window and door locks include electric DC motors coupled with the vehicle's electrical system for automatically opening or closing the windows and door locks when the vehicle's occupants activate control buttons.

Although electrically operated windows and door locks are convenient, they create potentially life-threatening safety hazards if the vehicle is involved in a collision. A vehicle's battery is typically located in the front of the vehicle's engine compartment and therefore is often destroyed or disconnected from the vehicle's electrical system when the vehicle is wrecked, especially in head-on collisions. The destruction or disconnection of the vehicle's battery disables the electrically operated windows and door locks since they are powered by the vehicle electrical system.

When the electrically operated windows and door locks fail, the occupants of the vehicle can become trapped within the vehicle since the vehicle's windows and doors are often raised and locked, respectively. Moreover, emergency personnel often cannot effectively remove the occupants from the vehicle without breaking the windows because they cannot easily unlock the doors or lower the windows. As a result, many vehicle accident victims cannot be extricated from a crashed vehicle in a timely manner, resulting in increased injuries and potential loss of life.

The problems associated with electrically operated windows and door locks are especially serious when a vehicle becomes submerged under water. Those skilled in the art will appreciate that a vehicle's electrical system nearly always fails when submerged in water. Moreover, the pressure of the water surrounding the submerged vehicle creates an inward force on the vehicle doors. This water pressure prevents the occupants from opening the doors until the vehicle's windows are lowered to equalize the pressure. However, since the vehicle's electrical system becomes inoperative when under water, the electrically operated windows cannot be lowered. Thus, many crash victims drown because they cannot open their vehicle doors or lower the windows to escape from the submerged vehicle.

Safety devices have been developed for providing a second source of power to a vehicle's electrically operated windows and door locks in the event of a main battery failure. For example, U.S. Pat. No. 4,307,789 discloses a control circuit including an auxiliary battery connected with the vehicle's main battery for operating the electrically operated windows and door locks in the event of a main battery failure.

Prior art safety devices such as the one described above suffer from several limitations that limit their utility. For example, the auxiliary battery of this type of prior art safety device is typically wired directly to the main battery. Accordingly, when the main battery is destroyed during a collision, the auxiliary battery is also often destroyed or disconnected from the vehicle's electrical system. Another limitation of prior art safety devices is that the auxiliary battery typically provides power to all of the vehicle's electrically operated windows and door locks over a single circuit. If this single circuit is damaged or disconnected in a collision, the entire safety device becomes inoperative.

A more serious limitation of prior art safety devices is that they merely provide a redundant source of power to the vehicle's electrical system but do not include means for automatically opening the windows and door locks when the vehicle electrical system fails. This is a problem because accident victims frequently become disoriented or unconscious after a collision and thus cannot operate the electrically operated windows and door locks. Thus, the mere addition of a redundant source of power to the vehicle's electrical system does not adequately solve the problem of trapped accident victims.

In view of the above-described limitations, there is a need for an improved vehicle safety exit apparatus that overcomes the limitations of the prior art.

OBJECTS AND SUMMARY OF THE INVENTION

In view of the foregoing, it is an object of the present invention to provide a vehicle safety exit apparatus that includes an auxiliary source of power for powering the electrically operated windows and door locks independently of the vehicle's main battery.

It is another object of the present invention to provide a vehicle safety exit apparatus that includes more than one circuit for opening the vehicle's windows and door locks after a collision.

It is another object of the present invention to provide a vehicle safety exit apparatus that includes means for automatically opening a vehicle's windows and door locks when the vehicle's main battery becomes disabled.

In view of these and other objects evident from the following description of a preferred embodiment of the invention, an improved vehicle safety exit apparatus operable for powering and controlling a vehicle's electrically operated windows and door locks is provided. The vehicle safety exit apparatus is preferably used with a vehicle having a main battery, an ignition switch and a plurality of electric window and door lock operators.

The preferred vehicle safety exit apparatus broadly includes an auxiliary battery and a control assembly. The auxiliary battery is operable for delivering power to the vehicle's electrically operated window and door lock operators in emergency situations. The control assembly is coupled between the auxiliary battery and the vehicle's window and door lock operators and is operable for controlling the delivery of power therebetween.

In more detail, the auxiliary battery is electrically isolated from the vehicle's main battery and is preferably positioned within the passenger compartment of the vehicle. The auxiliary battery is sealed and is therefore operable even when under water.

The control assembly controls the delivery of power from the auxiliary battery to the vehicle's electrically operated window and door lock operators and is operable for automatically opening the vehicle's windows and door locks when the vehicle's main battery is destroyed or disconnected from the vehicle's electrical system during a collision. The control assembly includes circuitry for sensing when the main battery is no longer delivering power to the vehicle electrical system and for switching power from the auxiliary battery to the window and door lock operators in response thereto.

The preferred control assembly includes a dual relay having a first circuit for controlling the delivery of power to the window and door lock operators on the left side of the vehicle and a second circuit for controlling the delivery of power to the window and door lock operators on the right side of the vehicle. Each circuit includes a relay coil coupled with the vehicle's main battery for sensing when the main battery becomes disabled. Each relay coil is magnetically coupled with a corresponding relay switch for switching power to the electrical window and door lock operators when the main battery becomes disabled.

The preferred vehicle safety exit apparatus also includes a manually activated safety exit switch coupled between the auxiliary battery and the window and door lock operators. The manual safety exit switch is positioned in the interior of the vehicle within easy reach of the vehicle's occupants and is operable for switching power from the auxiliary battery to the window and door lock operators when actuated. The manual exit switch is preferably connected in parallel with the control means so that it switches power to the window and door lock operators independently of the above described control assembly. In this way, an occupant can open all of the vehicle's windows and door locks in emergency situations regardless of the state of the vehicle's main battery.

The preferred vehicle safety exit apparatus also includes a vehicle deceleration sensor, a vehicle impact sensor, and a water sensor. Each sensor is operable for switching power from the auxiliary battery to the window and door lock operators when actuated by emergency events such as sudden deceleration of the vehicle, vehicle collision, and vehicle submersion, respectively.

By providing a vehicle safety exit apparatus constructed as described above, numerous advantages are realized. For example, by providing an auxiliary battery electrically isolated from the vehicle main battery, the vehicle's electrically operated window and door lock operators receive power even when the main battery is destroyed or disconnected from the vehicle electrical system. Since the auxiliary battery is electrically isolated from the vehicle's main battery, it remains operable even when the wiring leading from the main battery becomes disconnected or damaged.

Additionally, by providing a control means that senses when a vehicle's main battery is no longer delivering power to the vehicle's electrical system and automatically opens the vehicle's windows and door locks in response thereto, the vehicle safety exit apparatus is operable for automatically opening a vehicle's windows and door locks after a collision. Thus, accident victims can more easily escape from a wrecked or submerged vehicle without fumbling for control buttons, and emergency personnel can more easily remove an unconscious accident victim from a wrecked vehicle.

Additionally, by providing a control assembly including a dual relay having a first circuit for controlling the delivery of power to the window and door lock operators on the left side of the vehicle and a second circuit for controlling the delivery of power to the window and door lock operators on the right side of the vehicle, the vehicle safety exit apparatus remains partially operable even when the wiring on one side of the vehicle becomes destroyed during a collision.

BRIEF DESCRIPTION OF THE DRAWING FIGURE

A preferred embodiment of the present invention is described in detail below with reference to the attached drawing figure. The figure illustrates an electrical schematic diagram of a vehicle safety exit apparatus constructed in accordance with a preferred embodiment of the invention.

DETAILED DESCRIPTION OF THE PREFERRED EMBODIMENTS

Turning now to the drawing figure, a vehicle safety exit apparatus 10 constructed in accordance with a preferred embodiment of the invention is illustrated. The vehicle safety exit apparatus 10 powers and controls a vehicle's electrically operated windows and door locks in emergency situations. The vehicle safety exit apparatus 10 is preferably coupled with a vehicle 11 having a main battery 12, an ignition switch and a plurality of electric window and door lock operators 14. Those skilled in the art will appreciate that the vehicle safety exit apparatus 10 can be integrated as a part of a vehicle's electrical system or may be provided as a separate system coupled with the vehicle's existing electrical system.

The preferred vehicle safety exit apparatus 10 broadly includes an auxiliary battery 16 and a control assembly 18. The auxiliary battery 16 is operable for delivering power to the vehicle's electrically operated window and door lock operators 14 in emergency situations. The control assembly 18 is coupled between the auxiliary battery 16 and the vehicle's window and door lock operators 14 for controlling the delivery of power therebetween.

In more detail, the auxiliary battery 16 is preferably a 12-volt, 7.5 amp sealed battery such as Model No. D126 manufactured by Radionics. As illustrated in the electrical schematic diagram, the auxiliary battery 16 is electrically isolated from the vehicle main battery 12 and is preferably located within the passenger compartment of the vehicle. With this configuration, the auxiliary battery 16 is not charged by the main battery 12 and therefore operates independently of the main battery 12. Since the auxiliary battery 16 is positioned in the passenger compartment, it is protected from damage when the vehicle is involved in a collision. The auxiliary battery 16 is sealed; therefore, it is capable of delivering power to the vehicle's electrically operated windows and door locks even when exposed to water.

A low-power warning circuit 20 is coupled with the auxiliary battery 16 for indicating when the power level of the auxiliary battery 16 has dropped below a predetermined level. The warning circuit 20 includes a warning light 22 and a warning relay 24.

The warning light 22 is connected between the vehicle's main battery 12 and a ground switch 21. The ground switch 21 is normally open so that the warning light 22 is normally not illuminated. The warning relay 24 is coupled with the auxiliary battery 16 and is magnetically coupled with the ground switch 21. When the power level of the auxiliary battery 16 drops below a predetermined power level, the warning relay 24 becomes de-energized and closes the ground switch 21. With this configuration, the warning light 22 is illuminated by the vehicle's main battery 12 whenever the power level of the auxiliary battery 16 drops below a predetermined level. The warning light 22 is preferably mounted within the passenger compartment of the vehicle so that it can be easily seen by the vehicle's occupants.

A two-pole switch 26 couples the auxiliary battery 16 and the vehicle's main battery 12 with the control assembly 18 and the remaining components of the vehicle safety exit apparatus 10. The two-pole switch 26 is triggered by the vehicle's ignition switch. When the vehicle's ignition is turned on, both contacts of the two-pole switch 26 close and connect the auxiliary battery 16 and the vehicle's main battery 12 to the remaining components of the vehicle safety exit apparatus 10. Those skilled in the art will appreciate that the two-pole switch 26 can be installed as the vehicle's main ignition switch or can be a stand-alone switch configured to operate in conjunction with the vehicle's ignition switch.

The control assembly 18 is coupled between the auxiliary battery 16 and the vehicle's window and door lock operators 14 and is operable for controlling the delivery of power therebetween. As described in more detail below, the control assembly 18 automatically opens the vehicle's windows and door locks when the vehicle's main battery 12 is destroyed or disconnected from the vehicle's electrical system during a collision.

The control assembly 18 preferably includes a dual relay such as those manufactured by Tandy Corporation. The dual relay includes a first relay circuit 28 coupled between the auxiliary battery 16 and the window and door lock operators 14 on the left side of the vehicle and a second relay circuit 30 coupled between the auxiliary battery 16 and the window and door lock operators 14 on the right side of the vehicle.

Each relay circuit 28 and 30 includes a relay coil 31 and a relay switch 33. Each relay coil 31 is coupled with the main battery 12 by one pole of the above described two-pole switch 26. When the vehicle's ignition switch is operated, the two-pole switch 26 closes, and the relay coils 31 are energized. Conversely, when the vehicle's ignition switch is turned off, the two-pole switch 26 opens, and the relay coils 31 are de-energized.

Relay switches 33 are coupled between the auxiliary battery 16 and the window and door lock operators 14. When the relay switches 33 are closed, they conduct power from the auxiliary battery 16 to the window and door lock operators 14. Conversely, when the relay switches 33 are opened, they disrupt the delivery of power from the auxiliary battery 16 to the window and door lock operators 14. Each relay switch 33 is magnetically coupled with its respective relay coil 31. The relay switches 33 shift to the opened position when their respective relay coils 31 are energized and shift to the closed position when their respective relay coils 31 are de-energized. Thus, the relay switches 33 close and deliver power from the auxiliary battery 16 to the window and door lock operators 14 whenever the main battery 12 is disabled.

The above-described control assembly 18 is operable for sensing when the vehicle's main battery 12 is destroyed or disconnected from the vehicle's electrical system during a collision and for automatically opening the vehicle's windows and door locks in response thereto. For example, when the vehicle's ignition switch or the two-pole switch 26 is closed, and the main battery 12 is operating normally, the relay coils 31 are energized. The energized relay coils 31 open their respective relay switches 33 and interrupt the delivery of power from the auxiliary battery 16 to the electrically operated windows and door locks. Thus, when the main battery 12 is operating normally the control assembly 18 is bypassed and the vehicle's windows and door locks can be operated independently of the dual relay. However, when the vehicle's ignition switch or the two-pole switch 26 is closed, but the main battery 12 is either inoperable or disconnected from the vehicle's ignition system, the relay coils 31 remain de-energized and thus sense that the main battery 12 has failed. This causes the relay switches 33 to close, thus delivering power from the auxiliary battery 16 to the window and door lock operators 14. As a result, the vehicle's windows and door locks are automatically opened and unlocked, respectively.

The preferred vehicle safety exit apparatus 10 also includes a manually activated safety exit switch 32 coupled between the auxiliary battery 16 and the window and door lock operators 14. The manual safety exit switch 32 is normally open and is operable for closing and delivering power from the auxiliary battery 16 to the window and door lock operators 14 when activated by any of the occupants of the vehicle. The manual safety exit switch 32 is preferably positioned in the passenger compartment of the vehicle so that it is within easy reach of the vehicle's occupants.

As illustrated in the electrical schematic diagram, the manual safety exit switch 32 is connected in parallel with the control assembly 18 so that it switches power to the window and door lock operators 14 independently of the control assembly 18. With this configuration, an occupant of the vehicle can bypass the control assembly 18 and open all of the vehicle's windows and door locks simultaneously in emergency situations regardless of the condition of the control assembly 18.

The preferred vehicle safety exit apparatus 10 also includes a plurality of other safety devices operable for delivering power from the auxiliary battery 16 to the window and door lock operators 14 in emergency situations. For example, a vehicle deceleration sensor 34 is connected in parallel with the manual safety exit switch 32 for automatically opening the vehicle's windows and door locks when the vehicle is suddenly decelerated. The vehicle deceleration sensor 34 can be positioned anywhere within the vehicle compartment.

Similarly, a vehicle impact sensor 36 is connected in parallel with the manual safety exit switch 32 for automatically opening the vehicle's window and door locks when the vehicle is involved in a collision. A plurality of vehicle impact sensors 36 may be provided to detect impact at various locations on the vehicle. For example, sensors may be mounted near the vehicle's front and rear bumpers and left and right doors.

A water sensor 38 such as a conductivity sensor or float device is connected in parallel with the manual safety exit switch 32 for automatically opening the vehicle's window and door locks when the vehicle becomes submerged under water. Those skilled in the art will appreciate that additional sensors and safety devices may also be provided for automatically opening the vehicle's window and door locks in a variety of other emergency situations.

To assist emergency personnel in locating a vehicle that has been involved in a collision, the vehicle safety exit apparatus 10 includes a distress horn 40 and a locating light 42 coupled in series with the control assembly 18, manual safety exit switch 32, deceleration sensor 34, impact sensor 36, and water sensor 38. As illustrated in the electrical schematic diagram, the distress horn 40 and locating light 42 are activated whenever the vehicle has been involved in a collision. A light sensitive relay 44 is coupled with the locating light 42 for enabling the locating light 42 only when the ambient light levels drop below a pre-determined level. The distress horn 40 and locating light 42 are preferably mounted on the exterior of the vehicle so that they can be easily heard and seen when the vehicle is involved in a collision.

In operation, the above-described vehicle safety exit apparatus 10 powers and controls a vehicle's electrically operated windows and door locks in emergency situations. The control assembly 18 and auxiliary battery 16 cooperate to automatically open the vehicle's windows and door locks whenever the vehicle's main battery 12 becomes damaged or disconnected from the vehicle's electrical system during a collision. The manual safety exit switch 32 and the auxiliary battery 16 cooperate to open the vehicle's windows and door locks whenever activated by an occupant of the vehicle. With this configuration, a vehicle's electrically operated windows and door locks can be opened either automatically or manually.

Although the invention has been described with reference to the preferred embodiment illustrated in the attached drawing figures, it is noted that equivalents may be employed and substitutions made herein without departing from the scope of the invention as recited in the claims. For example, the specific vehicle safety exit circuit illustrated and described herein is illustrative of one preferred embodiment and can be modified as a matter of design choice.

Having thus described the preferred embodiment of the invention, what is claimed as new and desired to be protected by Letters Patent includes the following:

1. A vehicle safety exit apparatus for use in a vehicle having an electrical system including a main battery, an ignition switch and left and right side electric window and door lock operators, said vehicle safety exit apparatus comprising:

an auxiliary battery; and control means for controlling the delivery of power from said auxiliary battery to the left and right side window and door lock operators, said control means including sensing means for sensing disablement of the main battery, and switching means responsive to said sensing means for switching power from said auxiliary battery to the left and right side window and door lock operators for actuating the left and right side window and door lock operators when said sensing means senses the disablement of the main battery, said sensing means including a dual relay having a pair of independently operating first and second relays, wherein said first relay is coupled between said main battery and the left side window and door lock operators and said second relay is coupled between said main battery and the right side window and door operators.

2. The apparatus as set forth in claim 1 further including a manually activated safety exit switch operable for switching power from said auxiliary battery to the window and door lock operators when actuated by an occupant of the vehicle.

3. The apparatus as set forth in claim 2, wherein said manual safety exit switch is operable for switching power to the window and door lock operators independently of said first and second relays.

4. The apparatus as set forth in claim 3 further including a vehicle deceleration sensor operable for sensing when the vehicle is rapidly decelerated and for switching power to the window and door lock operators in response thereto.

5. The apparatus as set forth in claim 4, wherein said vehicle deceleration sensor is operable for switching power to the window and door lock operators independently of said first and second relays.

6. The apparatus as set forth in claim 5 further including a vehicle impact sensor operable for sensing when the vehicle impacts an object and for switching power to the window and door lock operators in response thereto.

7. The apparatus as set forth in claim 6, wherein said impact sensor is operable for switching power to the window and door lock operators independently of said first and second relays.

8. The apparatus as set forth in claim 7 further including a water sensor operable for sensing when the vehicle is underwater and for switching power to the window and door lock operators in response thereto.

9. The apparatus as set forth in claim 8, wherein said water sensor is operable for switching power to the window and door lock operators independently of said first and second relays.

10. The apparatus as set forth in claim 9 further including a distress horn operable for broadcasting a horn signal when any one of said first and second relays, manual safety exit switch, vehicle deceleration sensor, vehicle impact sensor, and water sensor switches power to the window and door lock operators.

11. The apparatus as set forth in claim 10 further including a vehicle locating light operable for emitting a light signal when any one of said first and second relays, manual safety exit switch, vehicle deceleration sensor, vehicle impact sensor, and water sensor switches power to the window and door lock operators.

12. The apparatus as set forth in claim 1 further including an auxiliary battery low power warning circuit, said warning circuit including a warning light and a warning relay operable for switching power from the vehicle main battery to said warning light when the power level of said auxiliary battery drops below a predetermined power level.

13. In combination:

a vehicle having a main battery, an ignition switch, and left and right side electric window and door operators;

an auxiliary battery; and control means coupled between said auxiliary battery and said left and right side window and door lock operators for controlling the delivery of power therebetween, said control means including sensing means for sensing disablement of said main battery, said sensing means including a dual relay having a pair of independently operating first and second relays, wherein said first relay is coupled between said main battery and said left side window and door lock operators and said second relay is coupled between said main battery and said right side window and door operators, and switching means responsive to said sensing means for switching power from said auxiliary battery to said left and right side window and door lock operators for actuating said left and right side window and door lock operators when said sensing means senses disablement of said main battery.

14. The apparatus as set forth in claim 13 further including a vehicle deceleration sensor coupled between said auxiliary battery and said window and door lock operators, wherein said deceleration sensor is operable for sensing when said vehicle is rapidly decelerated and for switching power to said window and door lock operators in response thereto.

15. The apparatus as set forth in claim 14, wherein said vehicle deceleration sensor is connected in parallel with said first and second relays so that it switches power to said window and door lock operators independently of said first and second relays.

16. The apparatus as set forth in claim 15 further including a vehicle impact sensor coupled between said auxiliary battery and said window and door lock operators, wherein said impact sensor is operable for sensing when said vehicle impacts an object and for switching power to said window and door lock operators in response thereto.

17. The apparatus as set forth in claim 16, wherein said impact sensor is connected in parallel with said first and second relays so that it switches power to said window and door lock operators independently of said first and second relays.

18. The apparatus as set forth in claim 17 further including a water sensor coupled between said auxiliary battery and said window and door lock operators, wherein said impact sensor is operable for sensing when said vehicle is underwater and for switching power to said window and door lock operators in response thereto.

19. The apparatus as set forth in claim 18, wherein said water sensor is connected in parallel with said first and second relays so that it switches power to said window and door lock operators independently of said first and second relays.

20. The apparatus as set forth in claim 19 further including a distress horn operable for broadcasting a horn signal when any one of said dual relay, vehicle deceleration sensor, vehicle impact sensor, or water sensor switches power to said window and door lock operators.

21. The apparatus as set forth in claim 20 further including a vehicle locating light operable for emitting a light beam when any one of said dual relay, vehicle deceleration sensor, vehicle impact sensor, or water sensor switches power to the window and door lock operators.

22. In combination:

a vehicle including a main battery, an ignition switch, and a plurality of electric window and door operators;

an auxiliary battery;

an auxiliary battery low power warning circuit, said warning circuit including a warning light and a ground switch, said ground switch being operable for switching power from the vehicle main battery to said warning light when the power level of said auxiliary battery drops below a predetermined power level;

a dual relay coupled between said auxiliary battery and said window and door lock operators for controlling the delivery of power therebetween, said relay including sensing means for sensing disablement of said main battery, said relay further including switching means responsive to said sensing means for switching power from said auxiliary battery to said window and door lock operators when said sensing means senses disablement of said main battery, whereby said window and door lock operators open said vehicle windows and door locks; and a manually activated safety exit switch connected in parallel with said dual relay, wherein said manual exit safety switch is operable for switching power from said auxiliary battery to said window and door lock operators independently of said dual relay when actuated by an occupant of the vehicle.

* * * * *